United States Patent [19]

Mayrand et al.

[11] Patent Number: 5,532,918
[45] Date of Patent: Jul. 2, 1996

[54] HIGH POWER FACTOR SWITCHED DC POWER SUPPLY

[75] Inventors: James F. Mayrand, Townsend, Mass.; James Gregorich, Merrimack, N.H.

[73] Assignee: Digital Equipment Corporation, Maynard, Mass.

[21] Appl. No.: 227,493

[22] Filed: Apr. 14, 1994

Related U.S. Application Data

[63] Continuation of Ser. No. 896,256, Jun. 10, 1992, abandoned.

[51] Int. Cl.$^6$ .................................................. H02M 7/155
[52] U.S. Cl. ............................ 363/89; 363/80; 363/126; 323/222
[58] Field of Search .................................. 363/21, 40, 41, 363/80, 81, 79, 89, 126; 323/222

[56] References Cited

U.S. PATENT DOCUMENTS

| | | | |
|---|---|---|---|
| 4,677,366 | 5/1987 | Wilkinson et al. | 323/222 |
| 4,940,929 | 7/1990 | Williams | 323/222 |
| 4,974,141 | 11/1990 | Severinsky et al. | 363/81 |
| 5,134,355 | 7/1992 | Hastings | 323/211 |
| 5,146,398 | 9/1992 | Vila-Masot et al. | 363/89 |
| 5,168,210 | 12/1992 | Thus | 323/313 |
| 5,235,504 | 8/1993 | Sood | 363/53 |
| 5,237,492 | 8/1993 | King | 363/46 |
| 5,245,522 | 9/1993 | Kawaguchi et al. | 363/37 |

OTHER PUBLICATIONS

Article entitled "An On-Line UPS With Improved Input-Output Characteristics", 1992 IEEE, Joos et al., pp. 598–605.
Article entitled "UPS System Employing High Frequency PWM Techniques", 1990 IEEE, Campos et al., pp. 414–421.
Unitrode Switching Regulated Power Supply Design Seminar Manual, 1990, pp. 7–1 through 7–12, pp. 12–1 through 12–16, pp. P1–1 through P1–12, as described in the "Background" section of the application. The referenced pages include chapters entitled High Power Factor Switching Preregulator Design Optimization, High Power Factor Preregulators For Off–line Power Supplies, and Switching Power Supply Topology Review.

*Primary Examiner*—Peter S. Wong
*Assistant Examiner*—Adolf Berhane
*Attorney, Agent, or Firm*—Mark J. Casey; Denis G. Maloney; Arthur W. Fisher

[57] ABSTRACT

A high-power-factor power supply has a full-wave rectifier for rectifying an AC line voltage, a power regulator including switch means responsive to a control signal for controlling the application of the rectifier output to a load; and a control circuit for producing a switching control signal. The control signal includes a pair of AC line detectors: a first connected in a closed-loop automatic gain control arrangement, and the other connected in an open-loop arrangement. The control circuit initially produces a CURRENT DEMAND REFERENCE signal that is directly related to the difference between the power supply DC output voltage and a self-generated constant reference, and to the waveform shape of the AC line voltage, and is inversely related to magnitude changes of the AC line voltage. The control signal then produces the switching control signal in response to both the CURRENT DEMAND REFERENCE signal and the current flowing in the power supply. The invention avoids the square law dependency of prior art high-power-factor power supplies, can operate over a broad input dynamic range, and is "self-biasing" in that the power supply itself generates any needed reference voltages.

30 Claims, 3 Drawing Sheets

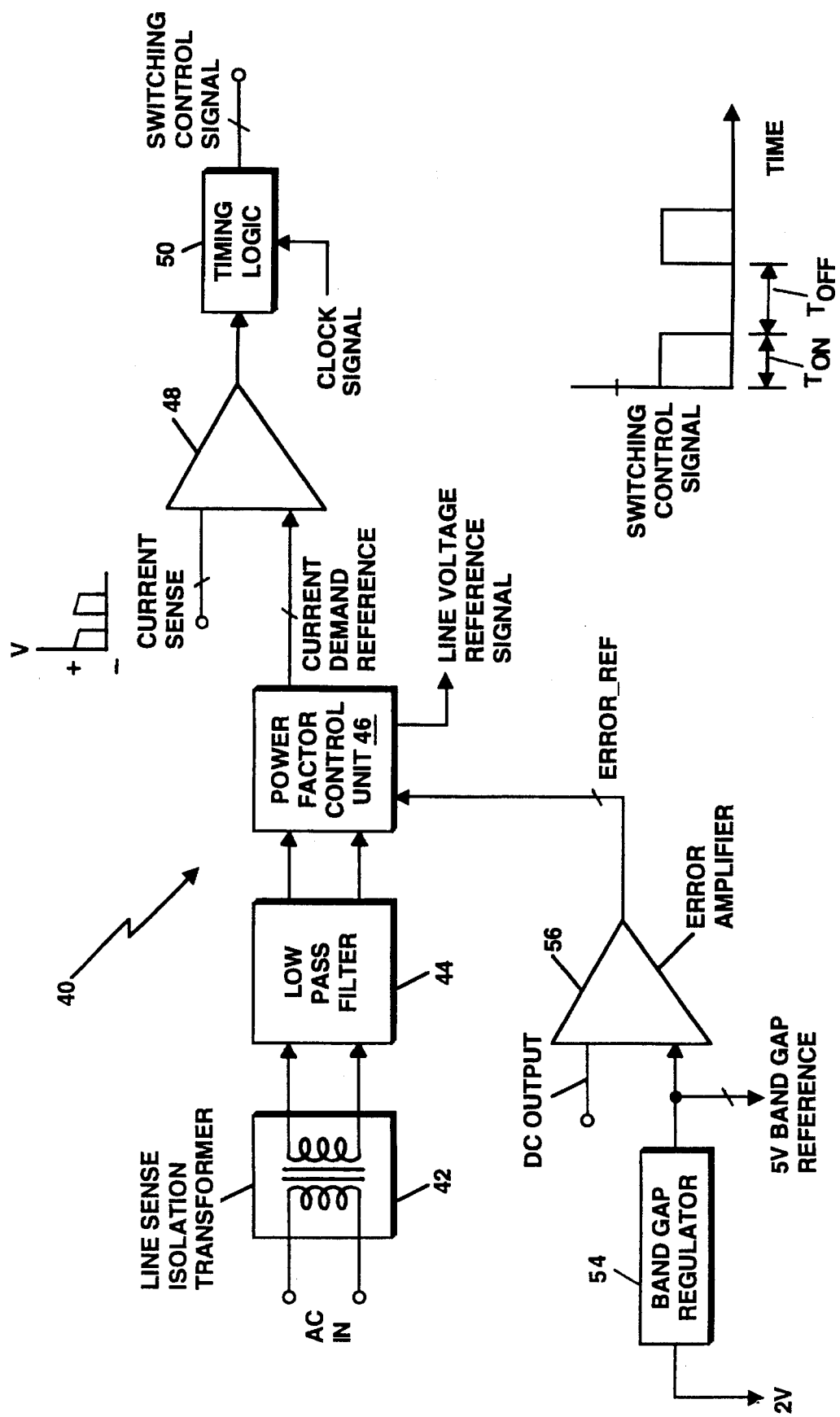

HIGH POWER FACTOR SWITCHED DC POWER SUPPLY

This is a application is a continuation of application Ser. No. 07/896, 256, filed Jun. 10, 1992, now abandoned.

FIELD OF THE INVENTION

The invention relates to electrical power supplies, and more particularly to power supplies that convert sinusoidal alternating-current ("AC") line voltages to substantially constant, direct-current ("DC") voltages with near unity power factor.

BACKGROUND OF THE INVENTION

A conventional switched power supply employs a full wave rectifier for rectifying an AC input supplied by a power line, and a power regulator circuit coupled with the rectifier for delivering a DC voltage of substantially constant magnitude to a load.

The power supply provides the rectified AC line input to the load during only the portion of each of its cycles when its voltage is above the desired DC output voltage. The power supply also charges a storage capacitor during that high-voltage portion of each cycle, and discharges the capacitor for energizing the load during the remaining, low-voltage portion of each cycle. For this reason, the power regulator has a solid state switch, e.g., a field effect transistor ("FET"), responsive to a switching control signal from a control circuit for coupling to the load in alternation the rectified AC line voltage and the discharged voltage from the capacitor.

Conventionally, the control circuit monitors the AC line using a line sense transformer, and, in response, controls the duty cycle of the switching control signal. The switching control signal typically changes between high and low voltage levels in a digital manner so as to respectively turn on and off the FET at the desired times during each AC line voltage cycle.

Some switched power supplies are adapted for operating with high, i.e., near unity (about 0.95–1.0), power factors. Commonly, such a high-power-factor ("HPF") power supply modulates the duty cycle of the switching control signal to achieve a high power factor by forcing the current drawn by the power supply to be in phase with the supplied line voltage. Such an approach is disclosed in U.S. Pat. No. 4,677,366, which issued Jun. 30, 1987 to Wilkinson, and in an article entitled "High Power Factor Pre-Regulators For Off-line Power Supplies" by Lloyd H. Dixon, Jr., which appeared in *Unitrode Switching Regulated Power Supply Design Seminar Manual*, 1990, by Unitrode Corporation, pages I2–1 through I2–16.

In the control circuit of the conventional HPF power supply, a voltage error amplifier produces an output that is a function of the difference between the output of the power supply and a reference voltage, and a switching analog multiplier produces an output that is proportional to the output of the voltage error amplifier multiplied by the instantaneous line voltage and divided by the square of the root-mean-square ("RMS") line voltage. Thus, the conventional control circuit has a square law dependency on the line voltage. The control circuit also has a current regulator for producing a current error signal responsive both to the current flowing in the power supply and to the output of the multiplier. A pulse-width modulator modulates the duty cycle of the control signal in response to the current error signal. The resulting control signal is provided to the control terminal of the semiconductor switch, e.g., the gate of the FET.

While HPF power supplies of the type just described are generally suitable for their intended purposes, they generally have limited input dynamic ranges. This is due to the fact that, in controlling the power factor, such power supplies generally use the square of the RMS line voltage divided by resistance. Unfortunately, operational amplifiers ("OP AMP's") typically employed in the control circuits are limited in their output to a 10-volt span. Consequently, the "voltage squared" term used by such control circuits requires that the OP AMP inputs representing the RMS line voltages be limited to the square root of ten, or about 3.1 volts. If the nominal input is one and a half volts, the control circuit can only exhibit a 2:1 input dynamic range. Thus, the conventional HPF power supplies can not accommodate RMS line voltages that extend beyond the range of, e.g., 150 volts to 300 volts.

To make matters worse, non-linearities near the limits of the input dynamic range further restrict the RMS voltages over which the prior art HPF power supplies can operate effectively.

Another drawback to the prior art HPF power supplies relates to the provision of the reference voltages used in the control circuits. Conventionally, the reference must be set to represent the desired DC level of the output from the power supply. The DC output level from the power supply can vary depending on the RMS amplitude of the AC line voltage. The RMS amplitude can vary as a result of line conditions, and can vary from country to country as a result of differing power distribution standards.

All of these factors must be taken into account in the prior art HPF power supplies in establishing the reference voltages. Thus, the prior art HPF power supplies typically utilize costly and complicated auxiliary voltage supplies to generate the reference voltages. Moreover, the prior art HPF power supplies typically have to use different line sense transformers in their control circuits for the different line power levels used in different parts of the world.

Furthermore, with any significant change in the AC line voltage, the prior art HPF power supplies require that the reference voltages be re-calibrated. It would be desirable to avoid the necessity to provide an auxiliary power supply and to eliminate or at least greatly reduce the need for transformer change-overs and re-calibration of the references.

Yet a further drawback of prior art switched power supplies relates to the harmonics they produce. Since the power supplies operate at higher frequencies than the power lines (e.g., about 100 kilo-Hertz compared with 60 Hz on the power lines), harmonics fed back onto the power lines can present special problems. It would be desirable to control the power factor with greater precision than in prior art arrangements so that the current drawn by the power supply more nearly tracks the waveform of the AC voltage so as to minimize harmonics.

SUMMARY OF THE INVENTION

The invention resides in a novel control circuit for a power regulator of a HPF power supply, which produces a CURRENT DEMAND REFERENCE signal that is directly related to the difference between the power supply DC output voltage and a self-generated constant reference signal, and to the waveform shape of the AC line signal, and inversely related to magnitude changes of the AC line voltage. The control circuit then produces the switching control signal in response to both the CURRENT DEMAND REFERENCE signal and the current flowing in the power supply. Thus, the invention avoids the square law dependency of the prior art HPF power supplies.

More specifically, the control circuit has first and second detectors responsive to the AC voltage for respectively generating (i) a first signal of substantially constant peak amplitude that is independent of the magnitude of the line signal and has substantially the same waveform (i.e., frequency and harmonics) as the full-wave-rectified line voltage, and (ii) a second signal whose magnitude varies with the magnitude of the AC line voltage.

Preferably, the first detector includes a "closed-loop" arrangement of an amplifier connected to receive the AC line voltage, a full-wave rectifier coupled with the amplifier for producing the first signal, which is also called a "haversine," and an automatic gain control circuit. The automatic gain control circuit compares the haversine with a self-generated constant reference, e.g., a band gap reference, and applies the difference therebetween to a gain control terminal of the first detector amplifier.

Preferably the second detector includes an "open-loop" gain control arrangement of an amplifier and a full-wave rectifier, and a gain controller for adjusting the gain of the amplifier. Preferably, the gain of the second detector amplifier is set to equal the gain of the first detector amplifier at the nominal voltage of the power line so that the first and second signals are the same at nominal line voltage.

Preferably, the first and second detector amplifiers are matched and implemented on the same integrated circuit chip to respond in a nearly identical manner to temperature and operating condition changes.

The control circuit also has a logarithmic ratiometric multiplier that operates at frequencies on the order of the line frequency. For example, where the AC line voltage has a frequency of 60 Hz., the ratiometric multiplier can operate at a frequency below 120 Hz along with low order harmonics thereof up to, e.g., 1000 Hz. The first signal is provided to a multiplicand input terminal "A" of the ratiometric multiplier as a "waveform reference." The RMS value of the second signal, which has a relatively low frequency, is supplied to the divisor input terminal "B" of the ratiometric multiplier. The ratiometric multiplier multiplies a signal, called ERROR-IN, which represents the difference between the power supply DC output voltage and a constant reference, preferably, a band gap reference, by the ratio of "A" to "B."

As the AC line voltage varies from the nominal value, the haversine provides the waveform reference, and the RMS value of the second signal varies proportionally with the line voltage, creating a change in the gain between the multiplier input (i.e., ERROR-IN) and output (i.e., CURRENT DEMAND REFERENCE). Consequently, the AC line voltage from the power line modulates both the shape and magnitude of the CURRENT DEMAND REFERENCE.

In addition, the control circuit has a comparator for producing the switching control signal in response to the difference between the current flowing through the power supply and the CURRENT DEMAND REFERENCE signal. Accordingly, switching control signal forces the power supply to draw current from the power line in such manner that near unity power factor is achieved while the DC output voltage remains substantially constant.

Accordingly, the switched power supply provided by the invention can provide a broad dynamic range (e.g., about 5:1) since it avoids the use of the "voltage squared" term used by the prior art and, instead, controls power using the linear equation of "current times voltage." Consequently, the invention can provide power factor control with precision linearity and, thereby, with reduced harmonics. These features make the invention particularly well suited to uninterruptible power supplies having battery back-ups. Moreover, the invention is "self-biasing," i.e. does not require external auxiliary power supplies for generating reference signals, and can use the same line sense transformer over a wide range of different line voltage levels. Consequently, the invention is readily adaptable for use under varying line conditions and with the wide range of nominal voltage levels that exist on power lines throughout the world.

BRIEF DESCRIPTION OF THE DRAWINGS

The above and further advantages of the invention may be better understood by referring to the following description in conjunction with the accompanying drawings, in which:

FIG. 2 is a graph depicting the duty cycle of the switching control signal produced by the control circuit of FIG. 1;

FIG. 3 is a diagram, partly in block from and partly in schematic detail, of the control circuit of FIG. 1.

DETAILED DESCRIPTION OF ILLUSTRATIVE EMBODIMENTS

Figure 1:
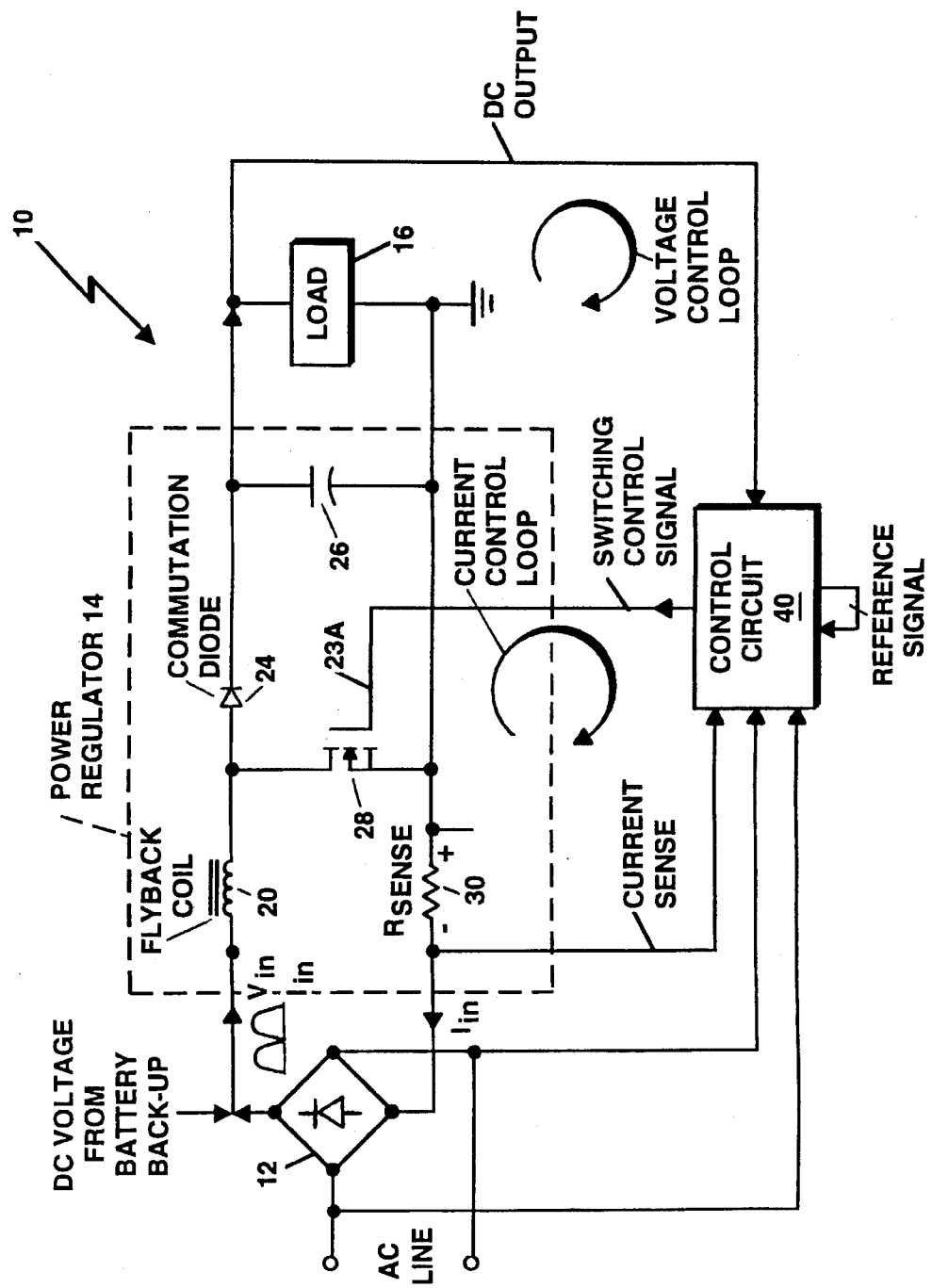
FIG. 1 is a diagram, partly in block form and partly in schematic detail, of an illustrative embodiment of HPF power supply in accordance with the invention.

FIG. 1 shows a HPF power supply 10 in accordance with an illustrative embodiment of the invention. The power supply 10 has a conventional full-wave rectifier 12 for rectifying an AC line voltage provided by an AC power line to produce a rectified voltage. The power supply 10 also has a conventional power regulator 14 for converting the rectified voltage into a substantially constant DC voltage, called "DC OUTPUT," that is supplied to a load 16.

The illustrative power regulator 14 can be called a "boost converter." It includes a "flyback" inductance coil 20 coupled to one of the output terminals of the rectifier 12 for integrating the rectified voltage to remove AC ripple therein, and a commutation diode 24 that, when forward biased, couples the inductance coil 20 to the load 16 and to a storage capacitor 26. The power regulator 14 also has a solid state switch 28, e.g., an FET, connected to the output of the inductance coil 20 and, via a sensor resistor 30, to another output terminal of the rectifier 12.

With this arrangement, the rectified voltage applies volt-seconds to the inductor coil 20 producing an output current. The solid state switch 28 then causes the output current of the inductance coil 20 to be provided to the load 16 and to the storage capacitor 26 for charging. Whenever the DC OUTPUT voltage goes above a pre-determined threshold, the solid state switch 28 decouples the output of the inductance coil 20 from the load 16, and causes the storage capacitor 26 to discharge to the load 16. By doing so, the solid state switch 28 operates to assure that the DC OUTPUT has a substantially constant magnitude. The commutation diode 24 prevents the current from the discharging capacitor 26 from reaching the inductance coil 20.

The invention can also be practiced with other conventional power supplies, such as those commonly referred to as "buck" or "flyback" converters. Such power supplies are described in the above-referenced article.

Operation of the solid state switch 28 is controlled by a control circuit 40, which operate within a voltage control loop and a current control loop. The control circuit 40 applies a switching control signal to a control electrode 28a of the solid state switch 28, e.g., the gate of the FET.

The control circuit 40 in accordance with the invention tracks the voltage on the AC power line, and generates a signal called the "CURRENT DEMAND REFERENCE" using ratiometric techniques in response to the AC line voltage (i.e., the RMS voltage and the voltage waveform thereof) and in response to an ERROR-IN signal. The ERROR-IN signal is indicative of the difference between DC OUTPUT and a constant-magnitude BAND GAP REFERENCE. In response to the CURRENT DEMAND REFERENCE and a CURRENT SENSE signal from the power regulator 14 indicative of the current flowing through the sensor resistor 30, the control circuit 40 generates the switching control signal.

As can be seen in FIG. 2, the switching control signal alternates between a first voltage level (e.g., about 10 volts) that is sufficient to drive the FET 28 into conduction (i.e., "$T_{on}$"), and a second voltage level, e.g., about zero volts, which maintains the FET 28 in a non-conducting state ("$T_{off}$"). The duty cycle of the switching control signal is defined as $T_{on}/(T_{on}+T_{off})$. By modulating $T_{on}$ during each duty cycle, the control circuit 40 assures that DC OUTPUT is substantially constant and that the power factor remains near unity.

FIG. 3 shows an illustrative implementation of the control circuit 40. The control circuit 40 has a line sense transformer 42 coupled to the AC power line, which provides the AC line voltage to a low-pass filter 44. The filtered AC line voltage is provided to a power factor control unit 46.

The control circuit 40 also includes a band gap regulator 54 for generating constant voltage (e.g., two volt and five volt) BAND GAP REFERENCE. One of the BAND GAP REFERENCES, e.g., the five volt value, is provided to an error amplifier 56, which also receives DC OUTPUT as a feedback signal. The error amplifier 56 produces an ERROR-REF signal indicative of the difference between DC OUTPUT and the voltage of its BAND GAP REFERENCE input. Where the AC line voltage has a frequency of, e.g., about 60 Hz., the ERROR-REF signal typically varies at no more than about ten Hertz.

In response to the AC line voltage from the power line and the ERROR-REF signal, the power factor control unit 46 produces the CURRENT DEMAND REFERENCE, which is provided to an analog comparator 48. The power factor control unit 46 also generates a line voltage reference indicative of the nominal AC line voltage (RMS), which can be useful, e.g., for "soft start" of the power supply 10 with controlled in-rush current.

In addition to the CURRENT DEMAND REFERENCE signal, the comparator 48 receives the CURRENT SENSE signal from the sensor resistor 30 (FIG. 1). The CURRENT SENSE signal comprises a series of pulses, each with a gradually decreasing magnitude as shown in FIG. 3, and a high frequency of, e.g., about 100 kilo-Hertz. This can be compared with the low frequency, e.g., about ten Hertz, of the CURRENT DEMAND REFERENCE signal.

The comparator output has a series of pulses. When the magnitude of the CURRENT SENSE signal equals the CURRENT DEMAND REFERENCE signal, the output of the comparator 48 goes low, thus determining the pulse width of the comparator output and its duty cycle.

The comparator output is provided to a timing logic 50. The timing logic 50 also receives a clock signal, e.g., at 100 kilo-Hertz, and, in response, produces the switching control signal at about the frequency of the clock signal and with the duty cycle of the comparator output. In other words, the clock signal determines the rising edges of the switching control signal pulses, and the comparator output determines the falling edges of the switching control signal pulses.

Alternatively, the timing logic 50 can use hysteretic techniques to generate the switching control signal, e.g., at about 80–100 kilo-Hertz, and without the need to use a clock signal. Such an asynchronous technique employs an inductance/resistance ("L/R") time constant related to the step response of the DC OUTPUT of the power regulator 14 and a hysteretic comparator as comparator 48.

When the CURRENT DEMAND REFERENCE signal is larger than the CURRENT SENSE signal, the switching control signal assumes a high voltage level that is sufficient to drive the FET 28 into conduction, thus resulting in a "closed switch" condition. When the CURRENT DEMAND REFERENCE signal is smaller than the CURRENT SENSE signal, the switching control signal assumes a low voltage level that causes the FET 28 to not conduct, i.e., thus resulting in an "open switch" condition. The switching control signal typically has a high frequency, e.g., about 100 kilo-Hertz, resulting in potentially high-frequency control of the FET 28.

The Power Factor Control Unit 46.

Figure 4:
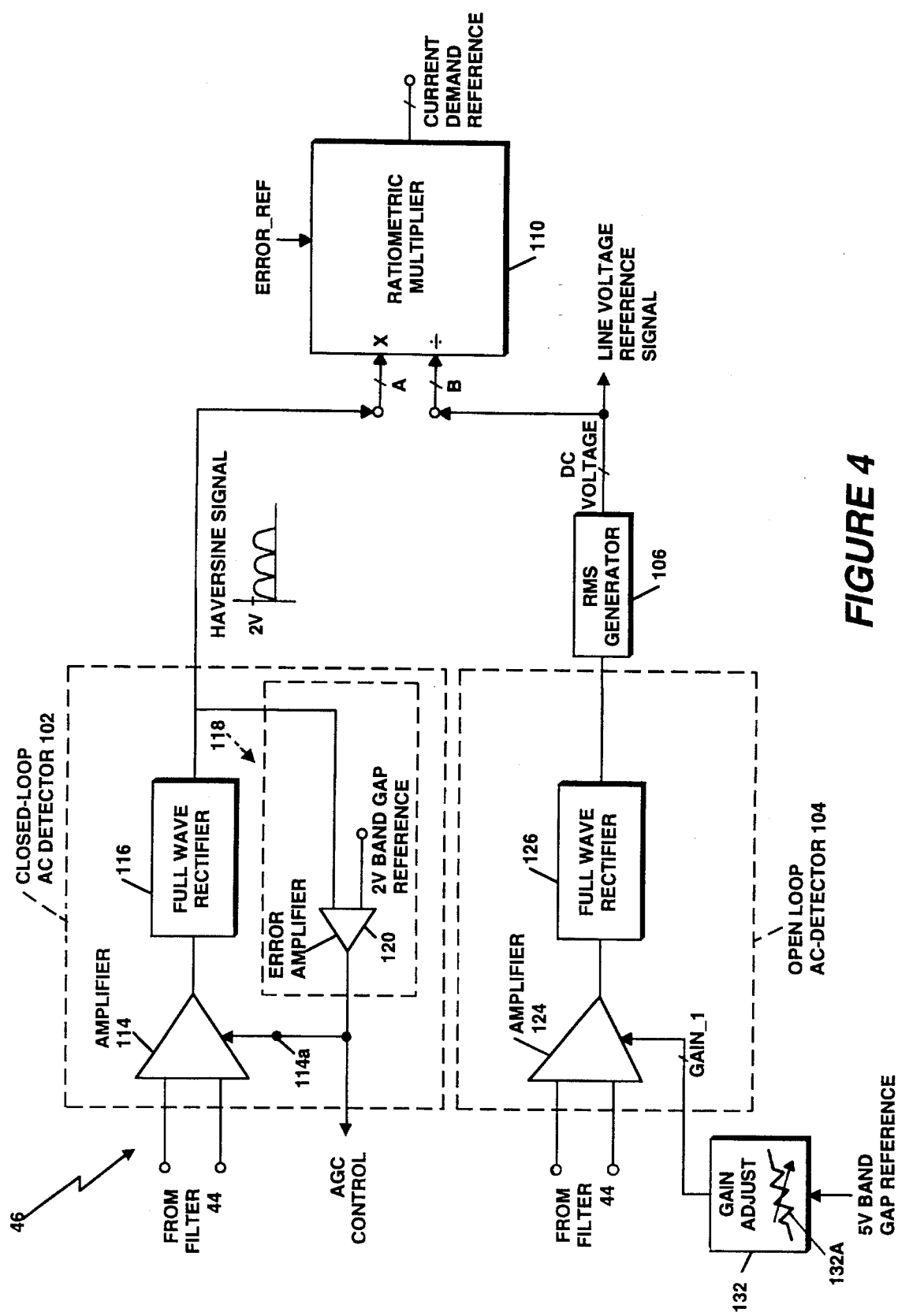
FIG. 4 is a diagram, partly in block form and partly in schematic detail, of the power factor control unit of FIG. 2.

FIG. 4 shows the power factor control unit 46 in greater detail. The power factor control unit 46 has a closed-loop AC detector 102 for generating a signal of constant peak amplitude (e.g., two volts, peak to peak), which is independent of the "magnitude" of the AC line voltage, and which has a waveform (i.e., frequency and harmonic content) that is substantially identical to that of the AC line voltage. The closed-loop AC detector 102 supplies its output to an "A" or "multiplicand" input terminal of a ratiometric multiplier 110.

The power control unit 46 also has an open-loop AC detector 104 for generating a voltage whose magnitude varies in accordance with the voltage of the AC line voltage.

The output of the open-loop AC detector 104 is supplied to an RMS generator 106, which functions essentially as an RMS voltmeter in that it "averages" the magnitude of the output of the open-loop AC detector 104. For a sinusoidal AC line voltage, as is the case here, the average voltage level is linearly related to the RMS level. The RMS generator 106 can be implemented generally as a capacitor/resistor circuit with a compensating amplifier (not shown), whose output varies about a constant voltage, e.g., two volts, in response to variations in the AC line voltage. The RMS generator supplies its output to a "B" or "divider" input of the ratiometric multiplier 110.

The components of the power factor control circuit 46 will now be described in greater detail.
The AC Detectors 102, 104.

With continued reference to FIG. 4, the closed-loop AC detector 102 has an amplifier 114 with automatic gain control. The amplifier 114 provides an amplified version of the AC line voltage received from the filter 44 to a full-wave rectifier 116. The output of the full-wave rectifier 116 can be called a "haversine," and has a frequency of twice the frequency of the AC line voltage from the power line. For example, if the AC line frequency is 60 Hz., the haversine has a frequency of 120 HZ. The haversine is provided to input terminal "A" of the ratiometric multiplier 110, as well as to a feedback circuit 118 for controlling the gain of amplifier 114.

The feedback circuit 118 includes an error amplifier 120, which amplifies the difference between the haversine and a constant voltage, e.g., the two volt BAND GAP REFERENCE signal. The output of the error amplifier 120 is provided to a gain control terminal 114a of the amplifier 114 and is called the AGC CONTROL signal. The AGC CONTROL signal causes the haversine to have a peak magnitude that is substantially equal to the constant voltage input, i.e., the two volt reference, to the error amplifier 120. The AGC CONTROL signal is also used during the self-calibrating set-up procedure for the open-loop AC detector 104, as described below.

The open-loop AC detector 104 includes an amplifier 124 and a full-wave rectifier 126 that are preferably implemented identically to the amplifier 114 and rectifier 116 of close-loop AC detector 102. The amplifier 124 provides an amplified version of the AC line voltage received from the filter 44 to the full-wave rectifier 126. The output of the full-wave rectifier 126 is provided to input terminal "B" of the ratiometric multiplier 110.

Preferably, the power factor control circuit 46 is implemented on a single integrated circuit, with the amplifiers 114, 116 and 120 being all matched amplifiers for responding in a nearly identical manner to temperature and operating condition changes. The gain adjust 132, however, is preferably external to that integrated circuit.

Significantly different from the automatic feedback control of amplifier 114, the gain of amplifier 124 is controlled by a gain adjust 132 in an open-loop arrangement. The gain adjust 132 preferably includes a resistive divider circuit, of which only variable resistor 132A is shown, for modifying a constant voltage, e.g., the five volt BAND GAP REFERENCE signal to produce a GAIN_1 signal for controlling the gain of the amplifier 124.

By adjusting the variable resistor 132A during a self-calibrating set-up procedure for the power supply 10, the GAIN_1 signal is set so that the gain of amplifier 124 is the same as that of amplifier 114 at nominal line voltage. Thus, at nominal line voltage, the outputs of the closed-loop and open loop AC detectors 102, 104 are nearly identical. Furthermore, because the amplifiers 114, 128 are matched, as noted above, temperature and operating point variations have substantially no effect on their operation. Indeed, the output signals from the AC detectors 102, 104 can track to within an error of less than 1%.

The self-calibrating set-up procedure for the open-loop AC detector 104 is straight forward and readily implemented. First, in the procedure, the AC line voltage is maintained at a nominal level. Then, at the nominal line voltage, the value of resistor 132A of the gain adjust 132 is manually adjusted so that GAIN_1 equals the AGC CONTROL signal. Afterwards, the power supply 10 is ready for HPF operation.

The Ratiometric Multiplier 110.

The ratiometric multiplier 110 is a logarithmic analog multiplier, preferably operating at frequencies not greater than the fundamental frequency of the haversine. The CURRENT DEMAND REFERENCE signal from the ratiometric multiplier 110 is equal to the input on terminal "A" divided by the input on terminal "B" times ERROR-REF, and thus is proportional to the ratio of the inputs on terminals "A" and "B." In effect, the ratiometric multiplier modulates the ERROR-REF signal with the ratio of the "A" and "B" inputs, therefore, the CURRENT DEMAND REFERENCE signal is directly related to the ERROR-REF signal and to the waveform shape of the AC line voltage, and inversely related to magnitude changes of the AC line voltage.

The logarithmic nature of the multiplication performed in the ratiometric multiplier 110 has advantages in many applications, e.g., in uninterruptible power supplies. Uninterruptible power supplies use batteries to supply current to the inductance coil 20 when the AC line voltage drops, e.g., due to a brown out or black out condition. When the AC line voltage thus drops, the "A" and "B" input signals to the multiplier can go to zero. Due to the logarithmic operation, the ratiometric multiplier 110 divides these zero value input signals to produce a ratio of ONE. In other words, the gain of the ratiometric multiplier 110 becomes unity when the AC line voltage drop to zero. Because the ratio is unity, the ratiometric multiplier 110 output, i.e., the CURRENT DEMAND REFERENCE signal is equal to the ERROR-REF signal, and thus control of the solid state switch 28 depends only on the voltage error in the DC OUTPUT. Such operation of course is desirable regardless of whether the power supply 10 is receiving an AC line voltage or the battery output so that DC OUTPUT can remain substantially constant. Another way to view this aspect of the invention is that, when the AC line voltage drops to zero, the "power factor control" operation of the power supply 10 drops "off line" automatically, and without affecting operation of the balance of the power supply 10.

The foregoing description has been limited to a specific embodiment of this invention. It will be apparent, however, that variations and modifications may be made to the disclosed embodiments, with the attainment of some or all of the advantages of the invention. Therefore, it is the object of the appended claims to cover all such variations and modifications as come within the true spirit and scope of the invention.

What is claimed is:

1. A high-power-factor switched power supply comprising a) a full-wave rectifier for rectifying an AC voltage from an AC power line for producing a full-wave rectified voltage, said AC line voltage having a waveform shape and a varying magnitude;

b) a power regulator coupled with the full-wave rectifier for providing a substantially constant DC output voltage to a load, including switch means responsive to a switching control signal for controlling the DC output voltage; and c) control means coupled with the switch means for supplying the switching control signal thereto, said control means including;

i) first means for producing a CURRENT DEMAND REFERENCE signal that is directly related to the difference between the DC output voltage and a predetermined, substantially constant reference signal, and to the waveform shape of the AC line voltage, and inversely related to magnitude changes of the AC line voltage, wherein said first means further includes first and second detectors that are both responsive to the AC power line and a reference voltage for respectively generating (i) a first signal of substantially constant peak amplitude that is substantially independent of the magnitude of the AC line voltage and has substantially the same waveform as the full-wave rectified voltage, and (ii) a second signal whose magnitude varies with the magnitude of the AC line voltage, and ii) second means for producing the switching control signal in response to both the CURRENT DEMAND REFERENCE signal and a current drawn by the power regulator from the AC power line.

2. The power supply in accordance with claim 1, wherein
   a) the first detector includes a "closed-loop" arrangement of a first amplifier having a variable gain and connected to receive the AC line voltage from the power line, a full-wave rectifier coupled with the first amplifier for producing the first signal, which is also called a "haversine," and an automatic gain control circuit, wherein the automatic gain control circuit compares the haversine with a substantially constant reference, and applies the difference therebetween to a gain control terminal of the first amplifier to the vary the gain of said first amplifier; and
   b) the second detector includes an "open-loop" gain control arrangement comprising a second amplifier having a variable gain, a full-wave rectifier, and a gain controller for manually setting the gain of the second amplifier at a normal AC line voltage condition.

3. The power supply in accordance with claim 2, wherein the gain of the second amplifier is set by the gain controller to equal the gain of the first amplifier at a nominal voltage of the AC line voltage so that the first and second signals are the same at the nominal voltage.

4. The power supply in accordance with claim 2, further including a reference regulator for supplying the reference voltage, and wherein the first and second amplifiers are matched and implemented, along with the reference regulator, on the same integrated circuit chip to respond in a nearly identical manner to temperature and operating condition changes.

5. The power supply in accordance with claim 1, wherein the first means further comprises a logarithmic ratiometric multiplier that multiplies the difference between the power supply DC output voltage and the reference by the ratio of the first signal to the RMS value of the second signal.

6. The power supply in accordance with claim 5, wherein the RMS value of the second signal is proportional to the time average of the second signal.

7. The power supply in accordance with claim 1, wherein the first means further comprises a logarithmic ratiometric multiplier that multiplies the difference between the power supply DC output voltage and the reference by the ratio of the first signal to the RMS value of the second signal, and the ratiometric multiplier operates at frequencies that are not greater than that of the haversine.

8. The power supply in accordance with claim 5, wherein the first means further comprises a logarithmic ratiometric multiplier that multiplies the difference between the power supply DC output voltage and the reference by the ratio of the first signal to the RMS value of the second signal, and the haversine has a substantially constant peak amplitude, and the RMS value of the second signal varies proportionally with the AC line voltage.

9. A high-power-factor switched power supply comprising
   a) a full-wave rectifier for rectifying an AC line voltage from an AC power line;
   b) a power regulator coupled with the full-wave rectifier for providing a substantially constant DC output voltage to a load, the power regulator including switch means responsive to a switching control signal for controlling the DC output voltage, and current sense means for producing a current sense signal indicative of current drawn from the AC power line by the power regulator;
   c) control means coupled with the switch means for supplying the switching control signal thereto, said control means including
      i) transformer means for monitoring the AC line voltage, said AC line voltage having a waveform with a varying magnitude,
      ii) closed-loop detector means coupled with said transformer means for generating a first signal of substantially constant peak amplitude that is substantially independent of the magnitude of the AC line voltage and has substantially the same waveform as the AC line voltage,
      iii) open-loop detector means coupled with said transformer means for generating a second signal whose magnitude varies with the magnitude of the AC line voltage,
      iv) RMS generating means coupled with the open-loop detector means for generating a third signal indicative of the root means square value of the second signal,
      v) voltage error means coupled with the power regulator for generating an error signal in response to the DC output voltage and a pre-determined, substantially constant reference,
      vi) a ratiometric multiplier coupled to the open-loop detector, the RMS generator means, and the voltage error means for generating a current demand reference in response to the first and third signals and the voltage error signal; and
      vii) comparator means coupled with the ratiometric multiplier, the current sense means, and the switch means for generating the switching control signal in response to the current demand reference signal and the current sense signal.

10. The power supply in accordance with claim 9, wherein
    a) the closed loop detector includes a first amplifier connected to receive the AC line voltage from the power line, said first amplifier having a variable gain, a full-wave rectifier coupled with the first amplifier for producing the first signal, which is also called a "haversine," and an automatic gain control circuit, wherein the automatic gain control circuit compares the haversine with a substantially constant reference, and applies the difference therebetween to a gain control terminal of the first amplifier; and
    b) the open loop detector includes a second amplifier having a variable gain, a full-wave rectifier, and a gain controller for adjusting the gain of the second amplifier.

11. The power supply in accordance with claim 10, wherein the gain of the second amplifier is set by the gain controller to equal the gain of the first amplifier at a nominal magnitude of the AC line voltage so that the first and second signals are the same at the nominal voltage magnitude.

12. The power supply in accordance with claim 10, wherein the first and second amplifiers are matched and implemented on the same integrated circuit chip to respond in a nearly identical manner to temperature and operating condition changes, and the third signal is applied to an output line from the integrated circuit chip.

13. The power supply in accordance with claim 10, wherein the ratiometric multiplier multiplies the voltage error signal by the ratio of the first signal to the third second signal.

14. The power supply in accordance with claim 10, wherein the ratiometric multiplier comprises a logarithmic multiplier that operates at frequencies that are not greater than that of the haversine.

15. In a high-power-factor switched power supply comprising a full-wave rectifier for rectifying an AC line voltage form an AC power line to produce a full-wave rectified voltage, a power regulator coupled with the full-wave rectifier for providing a substantially constant DC output voltage to a load, the power regulator including switch means responsive to a switching control signal for controlling the DC output voltage, and current sense means for producing a current sense signal indicative of current drawn from the AC power line by the power regulator; a method of supplying the switching control signal to the switch means of the power regulator comprising the steps of:

a) monitoring the AC line voltage, said AC line voltage comprising a waveform having a varying magnitude;

b) using a closed-loop detector for generating a first signal of substantially constant peak amplitude that is independent of the magnitude of the AC line voltage and has substantially the same waveform as the AC line voltage;

c) using an open-loop detector for generating a second signal whose magnitude varies with the magnitude of the AC line voltage;

d) generating a third signal indicative of the root means square value of the second signal;

e) generating an error signal in response to the difference between the DC output voltage and a pre-determined, substantially constant reference;

f) using a ratiometric multiplier for generating a current demand reference signal in response to the first and third signals and the voltage error signal; and g) generating the switching control signal in response to the current demand reference signal and the current sense signal.

16. The method in accordance with claim 15 a) wherein the first signal generating step includes amplifying the AC line voltage from the power line using a first amplifier to produce a first amplified signal, rectifying the first rectified voltage using a full-wave rectifier to produce the first signal, which is also called a "haversine," and controlling the gain of the first amplifier using an automatic gain control circuit, wherein the automatic gain control circuit compares the haversine with a pre-determined, substantially constant reference, and applies the difference therebetween to a gain control terminal of the first amplifier;

b) wherein second signal generating step includes amplifying the AC line voltage from the power line using a second amplifier having a controlled gain to produce a second amplified signal, and rectifying the second amplified signal using a full-wave rectifier to produce the second signal; and c) wherein the method further includes the step of setting the gain of the second amplifier to equal the gain of the first amplifier at a nominal magnitude of the AC line voltage so that the first and second signals are the same at the nominal AC line voltage magnitude.

17. The power supply in accordance with claim 1, wherein said first means includes a band gap regulator for generating said substantially constant voltage as a band gap reference.

18. The power supply in accordance with claim 9, wherein said first means includes a band gap regulator for generating said substantially constant voltage as a band gap reference.

19. The method in accordance with claim 15, wherein said step of generating an error signal includes the step of using a band gap regulator to produce said substantially constant reference.

20. A switched power supply comprising:

A) a full-wave rectifier for rectifying an AC line voltage from an AC power line, said AC line voltage comprising a waveform with a varying magnitude;

B) a power regulator coupled with said full-wave rectifier for providing a substantially constant DC output voltage to a load, said power regulator including switch means responsive to a switch control signal for controlling said DC output voltage, and current sense means for producing a current sense signal indicative of current drawn from said AC power line by said power regulator; and C) control means coupled with said switch means for supplying said switch control signal thereto, said control means including
i) waveform-generating means for generating a first signal comprising a waveform reference in response to said AC line voltage,
ii) magnitude-indicating means for generating a second signal indicative of a time average of said AC line voltage,
iii) error means coupled with said power regulator for generating an error signal in response to the difference between a signal indicative of said DC output voltage and a pre-determined, substantially constant reference,
iv) a multiplier coupled to said waveform-generating means, said magnitude-indicating means, and said error means for producing a current demand reference by multiplying said error signal by a ratio of said first signal to said second signal,
v) a comparator coupled with said multiplier, and said current sense means for generating an output responsive to the difference between said current demand reference and said current sense signal, and
vi) means coupled with said comparator and said switch means for applying said switch control signal to said switch means in response to said comparator output.

21. The switched power supply in accordance with claim 20, wherein said waveform-generating means includes:

A) a first amplifier for amplifying a signal indicative of the waveform of said AC line voltage with a variable gain;

B) a second full-wave rectifier coupled with said first amplifier for producing said first signal, said first signal comprising a haversine; and C) an automatic gain control circuit coupled with said second full wave rectifier and said first amplifier for applying the difference between said haversine and a substantially constant reference to a gain control terminal of said first amplifier.

22. The switched power supply in accordance with claim 20, wherein said magnitude-indicating means includes:

A) a second amplifier for amplifying a signal indicative of the magnitude of said AC line voltage with a variable gain;

B) a third full-wave rectifier coupled with said second amplifier for generating a rectified signal;

C) a gain controller coupled with said second amplifier for adjusting said gain of said second amplifier such that said gain of said second amplifier is approximately equal to said gain of said first amplifier at a nominal magnitude of said AC line voltage; and D) means coupled with said full-wave rectifier for producing a time-average of said rectified signal.

23. The switched power supply in accordance with claim 20, wherein said multiplier comprises a logarithmic ratiometric multiplier.

24. The switched power supply in accordance with claim 20, further comprising monitoring means coupled with both said waveform-generating means and said magnitude-indicating means for monitoring said AC line voltage, said monitoring means comprises a single, line-sense transformer.

25. The switched power supply in accordance with claim 20, wherein said magnitude-indicating means includes an RMS generator for generating said second signal indicative of an RMS value of a rectified version of said AC line voltage.

26. The switched power supply in accordance with claim 20, wherein said current sense means comprises a resistor.

27. The switched power supply in accordance with claim 20, wherein said error means includes a band gap regulator for generating said substantially constant reference as a band gap reference.

28. A switched power supply comprising:

A) a full-wave rectifier for rectifying an AC line voltage from an AC power line, said AC line voltage comprising a waveform with a varying magnitude;

B) a power regulator coupled with said full-wave rectifier for providing a substantially constant DC output voltage to a load, said power regulator including switch means responsive to a switch control signal for controlling said DC output voltage, and current sense means for producing a current sense signal indicative of current drawn from said AC power line by said power regulator; and C) control means coupled with said switch means for supplying said switch control signal thereto, said control means including i) means for monitoring said AC line voltage so as to produce an AC voltage having a magnitude varying in accordance with said AC line voltage, ii) a closed-loop detector coupled with said monitoring means for generating a first signal having a substantially constant peak amplitude and substantially the same waveform as said AC voltage, said closed-loop detector including (a) a first amplifier for amplifying said AC voltage with a variable gain, (b) a second full-wave rectifier coupled with said first amplifier for producing said first signal from said amplified AC voltage, said first signal comprising a haversine, and (c) an automatic gain control circuit coupled with said second full wave rectifier and said first amplifier for applying the difference between said haversine and a substantially constant reference to a gain control terminal of said first amplifier, iii) an open-loop detector coupled with said monitoring means for generating a second signal whose magnitude varies with said magnitude of said AC voltage, said open-loop detector including (a) a second amplifier for amplifying said AC voltage with a variable gain, (b) a third full-wave rectifier coupled with said second amplifier, and (c) a gain controller coupled with said second amplifier for adjusting said gain of said second amplifier such that said gain of said second amplifier is approximately equal to said gain of said first amplifier at a nominal magnitude of said AC voltage, iv) signal generating means coupled with said open-loop detector for generating a third signal indicative of a time average of said magnitude of said second signal, v) voltage error means coupled with said power regulator for generating an error signal in response to the difference between said DC output voltage and a pre-determined, substantially constant reference, vi) a multiplier coupled to said open-loop detector, said signal generating means, and said voltage error means for generating a current demand reference signal by multiplying the error signal by the ratio of the first signal to the third signal, vii) comparator coupled with said multiplier, said current sense means, and said switch means for generating an output responsive to the difference between said current demand reference signal and said current sense signal, viii) timing logic coupled with said comparator and said switch means for producing said switch control signal with a duty cycle responsive of the comparator output and with a selected frequency, and providing said switch control signal to said switch means.

29. The switched power supply in accordance with claim 28, wherein said multiplier comprises a ratiometric multiplier, which modulates said error signal from said voltage error means with the ratio of the haversine to the third signal, whereby said current demand reference is directly related to said error signal and to the waveform shape of the AC line voltage, and inversely related to magnitude changes of the AC line voltage.

30. The switched power supply in accordance with claim 10, wherein said ratiometric multiplier modulates said error signal from said voltage error means with a ratio of the haversine to the third signal, whereby said current demand reference is directly related to said error signal and to the waveform shape of the AC line voltage, and inversely related to magnitude changes of the AC line voltage.

* * * * *